(12) United States Patent
Matsuda (10) Patent No.: US 10,298,998 B2
(45) Date of Patent: May 21, 2019

(54) COMMUNICATION APPARATUS AND CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Jun Matsuda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/470,120

(22) Filed: Mar. 27, 2017

(65) Prior Publication Data

US 2017/0295399 A1 Oct. 12, 2017

(30) Foreign Application Priority Data

Apr. 6, 2016 (JP) ................................. 2016-076728

(51) Int. Cl.
| | |
|---|---|
| *G08B 13/196* | (2006.01) |
| *H04N 21/4363* | (2011.01) |
| *H04N 5/232* | (2006.01) |
| *H04N 5/073* | (2006.01) |
| *H04B 5/00* | (2006.01) |

(52) U.S. Cl.
CPC ... *H04N 21/43637* (2013.01); *G08B 13/1966* (2013.01); *G08B 13/19656* (2013.01); *G08B 13/19689* (2013.01); *H04B 5/0031* (2013.01); *H04N 5/0733* (2013.01); *H04N 5/23206* (2013.01); *H04N 5/23245* (2013.01); *H04N 2201/006* (2013.01)

(58) Field of Classification Search
CPC .......... H04N 21/43637; H04N 5/0733; H04N 5/23206; H04N 2201/006; G08B 13/19656; G08B 13/1966; G08B 13/19689; H04B 5/0031
USPC .......................................................... 386/234
See application file for complete search history.

(56) References Cited

U.S. PATENT DOCUMENTS

| | | | | |
|---|---|---|---|---|
| 6,509,845 | B1 * | 1/2003 | Tanaka .................. | G06F 3/0231 341/126 |
| 2014/0028875 | A1 * | 1/2014 | Hara ........................ | H04N 5/77 348/231.5 |
| 2014/0039804 | A1 * | 2/2014 | Park ..................... | A61B 5/0002 702/19 |
| 2017/0094703 | A1 | 3/2017 | Matsuda | |

* cited by examiner

*Primary Examiner* — Thai Q Tran
*Assistant Examiner* — Nien Yang
(74) *Attorney, Agent, or Firm* — Venable LLP (57) ABSTRACT

A communication apparatus accepts remote control from an external apparatus via wireless communication, and includes a communication unit configured to communicate with the external apparatus, and a control unit configured to execute, in response to an operation request that the communication unit has received from the external apparatus, the request being performed through the remote control, a task corresponding to the operation. The control unit sets a time interval relating to a timing at which communication with the external apparatus is performed, and controls the communication unit to perform communication with the external apparatus in compliance with the set time interval.

11 Claims, 7 Drawing Sheets

COMMUNICATION APPARATUS AND CONTROL METHOD THEREOF, AND NON-TRANSITORY COMPUTER-READABLE STORAGE MEDIUM

BACKGROUND OF THE INVENTION

Field of the Invention

The present invention relates to a communication apparatus, a control method of the communication apparatus, and a non-transitory computer-readable storage medium.

Description of the Related Art

In recent years, mobile phones and mobile devices such as digital cameras are also equipped with wireless communication functions. In these wireless communication technologies, standards such as Bluetooth Low Energy (BLE) for suppressing power consumption are coming into place. For example, a technique in which the data transmission/reception interval (connection interval: CI) in communication using BLE is changed according to the work mode of a device is disclosed (refer to U.S. Patent Application Publication No. 2014/0039804).

However, according to the BLE standard, even if a change of the CI is requested, the device cannot immediately change the CI. Therefore, in the case where a CI having a short interval is needed as in a case where the device is operated through remote control from an external apparatus, there is a risk of the device not being able to work properly through remote control until the CI is changed.

Specifically, in digital cameras, in the case where the interval of a key repeat event generated by a long pressing operation on a button is shorter than the CI, a key repeat event not intended by a user occurs in a period from when a button press-down event occurs until when a button release event occurs, and there is a risk of a task being executed that was not intended by the user.

SUMMARY OF THE INVENTION

The present invention enables a communication apparatus to work so as not to cause an unnecessary key repeat event to occur even in a case where the CI is longer than the interval of a key repeat event.

One aspect of embodiments of inventions relates to a communication apparatus that accepts remote control from an external apparatus via wireless communication, the communication apparatus comprising, a communication unit configured to communicate with the external apparatus, and a control unit configured to execute, in response to an operation request that the communication unit has received from the external apparatus, the request being performed through the remote control, a task corresponding to the operation, wherein the control unit sets a time interval relating to a timing at which communication with the external apparatus is performed, controls the communication unit to perform communication with the external apparatus in compliance with the set time interval, in a case where a first time interval has elapsed after having accepted the operation request that the communication unit received from the external apparatus without accepting a request to cancel the operation from the external apparatus, the request being performed through the remote control, executes the task corresponding to the operation again, and in a case where the set time interval is longer than the first time interval, even if the first time interval has elapsed without receiving a request to cancel the operation from the external apparatus, performs control such that the task corresponding to the operation is not executed again.

Further features of the present invention will become apparent from the following description of exemplary embodiments (with reference to the attached drawings).

DESCRIPTION OF THE EMBODIMENTS

Hereinafter, embodiments for implementing the invention will be described in detail with reference to the attached drawings. Note that the embodiments described below are exemplary arrangements for realizing the present invention, and may be modified or changed as appropriate, depending on the configuration and respective conditions of the apparatus to which the invention is to be applied. The individual embodiments can also be combined as appropriate.

Configuration of Communication Apparatus

Figure 1A:
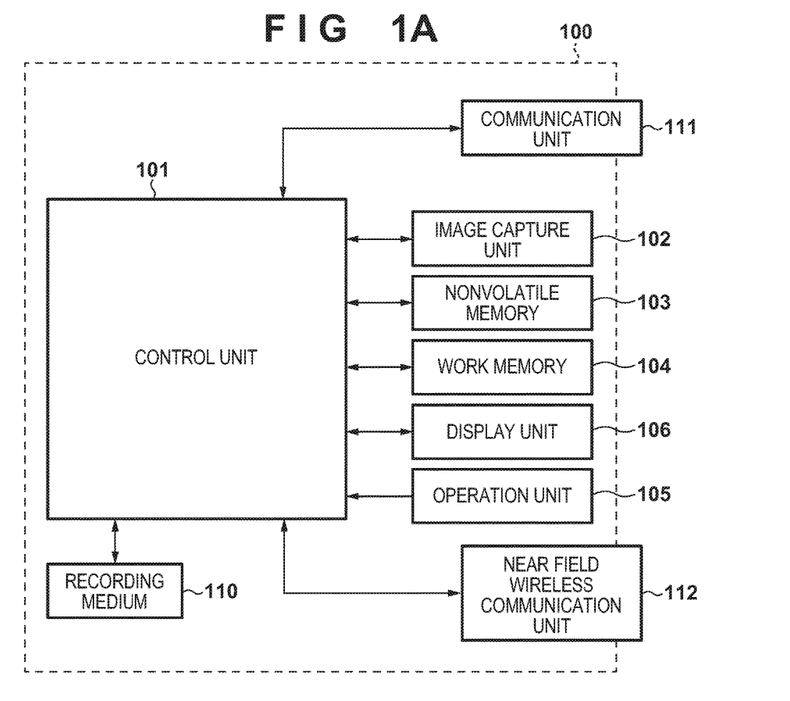
FIG. 1A is a diagram illustrating an exemplary configuration of a communication apparatus 100 corresponding to an embodiment.

First, an exemplary configuration of a communication apparatus according to the present embodiment will be described. FIG. 1A is a block diagram illustrating an exemplary configuration of a digital camera serving as an image capture apparatus, which is an exemplary communication apparatus 100 of the present embodiment. In the following description of the embodiment, the communication apparatus 100 will be described taking the digital camera as an example, but the embodiment of the communication apparatus 100 is not limited to the digital camera. For example, the communication apparatus 100 may be an arbitrary information processing apparatus or an image capture apparatus having an image capture function and a reproduction function such as a personal computer, a mobile phone, a smartphone, a PDA, a tablet device, a digital video camera, or a mobile media player. Hereinafter, the configuration of the communication apparatus 100 will be specifically described with reference to FIG. 1A.

A control unit 101 controls the units of the digital camera 100 according to an input signal and a later-described program. Note that, instead of the control unit 101 controlling the overall apparatus, a plurality of pieces of hardware may control the entire apparatus by sharing the processing. An image capture unit 102 is constituted by an optical lens unit, an optical system that controls aperture, zoom, focus or the like, an image sensor that converts light (image) guided thereto via an optical lens unit to an electrical image signal, and the like, for example. As an example of the image sensor, a CMOS (Complementary Metal Oxide Semiconductor) or a CCD (Charge Coupled Device) is commonly used. Under the control of the control unit 101, the image capture unit 102 converts light from the subject, an image being formed with the light by a lens included in the image capture unit 102, into an electrical signal by using an image sensor, then performs noise reduction processing and the like, and outputs digital data as image data. In the present embodiment, a series of processing for generating and outputting the image data is referred to as "shooting". In the digital camera 100 of the present embodiment, the image data is recorded in a recording medium 110 in conformity with the DCF (Design Rule for Camera File system) standard. In the present embodiment, a digital camera is described as the example of the communication apparatus 100, and therefore, the image capture unit 102 is included as a constituent element, but the communication apparatus 100 need not be configured to include the image capture unit 102.

A nonvolatile memory 103 is an electrically erasable and recordable nonvolatile memory, and stores a later-described program that is executed by the control unit 101, and the like. A work memory 104 is used as a buffer memory that temporarily stores image data generated by the image capture unit 102, an image display memory for a display unit 106, a work area for the control unit 101, and the like.

An operation unit 105 is a user interface for accepting an instruction to the digital camera 100 from a user. The operation unit 105 may include a power button for the user to instruct power on/off of the digital camera 100, a release switch for making a shooting instruction, and a reproduction button for making an instruction to reproduce image data. Furthermore, the operation unit 105 may include an operation member such as a connection button dedicated to starting communication with an external apparatus via a near field wireless communication unit 112. Also, a touch panel formed in the display unit 106 can be included in the operation unit 105. Note that the release switch includes an SW1 and an SW2. When the release switch enters a so-called half-pressed state, the SW1 is turned on. Accordingly, an instruction for performing a shooting preparation such as AF (autofocus) processing, AE (auto-exposure) processing, AWB (automatic white balance) processing, EF (pre-flashing) processing is accepted. Also, as a result of the release switch entering a so-called full-pressed state, the SW2 is turned on. Accordingly, an instruction for performing shooting is accepted.

The display unit 106 displays a view finder image when shooting, displays shot image data, and displays text characters for interactive operation. The display unit 106 need not be incorporated in the digital camera 100, and may be configured to be connected to the digital camera 100. The digital camera 100 can connect to an internal or external display unit 106, and needs only to include at least a display control function for controlling display of the display unit 106. The recording medium 110 can record image data that has been output from the image capture unit 102. The recording medium 110 may be configured to be detachable from the digital camera 100, or may be incorporated in the digital camera 100. The digital camera 100 needs only to include at least a unit for accessing the recording medium 110.

A communication unit 111 is an interface for connecting to an external apparatus. The digital camera 100 of the present embodiment can exchange data with the external apparatus via the communication unit 111. For example, the digital camera 100 can transmit image data generated by the image capture unit 102 to the external apparatus via the communication unit 111. Note that, in the present embodiment, the communication unit 111 includes an interface for performing communication in conformity with the IEEE802.11 standard, that is, with so-called wireless LAN, with the external apparatus. The control unit 101 realizes wireless communication with the external apparatus by controlling the communication unit 111. Note that the communication method is not limited to the wireless LAN, and includes an infrared communication method as well, for example. The communication unit 111 is an exemplary first wireless communication unit.

The near field wireless communication unit 112 is constituted by an antenna for wireless communication, a modulation/demodulation circuit for processing a wireless signal, and a communication controller, for example. The near field wireless communication unit 112 realizes near field wireless communication with the external apparatus in conformity with the IEEE802.15 standard (so-called Bluetooth (trademark)) by outputting a modulated wireless signal from the antenna and demodulating a wireless signal received by the antenna. In the present embodiment, the Bluetooth (trademark) communication adopts Bluetooth (trademark) version 4.0, Low Energy (hereinafter, abbreviated as BLE), which is a low power consumption version. This BLE communication has narrower communicable range than the wireless LAN communication (shorter communicable distance), and slower communication speed than the wireless LAN communication. On the other hand, the BLE communication consumes less power than the wireless LAN communication.

In the present embodiment, the communication speed of communication realized by the communication unit 111 is faster than the communication speed of communication realized by the near field wireless communication unit 112. Also, the communication realized by the communication unit 111 has a wider communicable range than the communication realized by the near field wireless communication unit 112.

Note that the communication unit 111 can have an AP mode in which the communication unit 111 works as an access point in the infrastructure mode, and a CL mode in which the communication unit 111 works as a client in the infrastructure mode. The digital camera 100, when the communication unit 111 is caused to work in the CL mode, works as a CL device in the infrastructure mode. Also, the digital camera 100 can, when the communication unit 111 is caused to work in the AP mode, work as a simplified AP that is one type of AP but has limited functions (hereinafter referred to as simple AP).

Figure 1B:
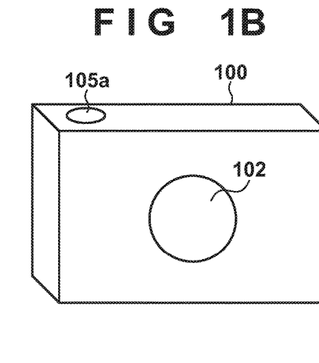
FIGS. 1B and 1C are diagrams illustrating an exemplary external appearance of a digital camera that is one embodiment of the communication apparatus.
Figure 1C:
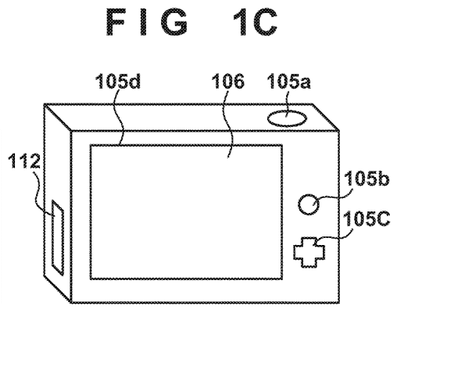

Next, the external appearance of the digital camera 100 will be described. FIGS. 1B and 1C are diagrams illustrating an exemplary external appearance of the digital camera 100. A release switch 105a, a reproduction button 105b, a direction key 105c, and a touch panel 105d are operation members included in the operation unit 105 described above. Also, an image obtained as a result of shooting by the image capture unit 102 is displayed in the display unit 106. Also, the digital camera 100 of the present embodiment includes an antenna portion of the near field wireless communication unit 112 on a side surface of the camera casing. The above is a description of the digital camera serving as the communication apparatus 100.

Configuration of Information Processing Apparatus

Figure 2:
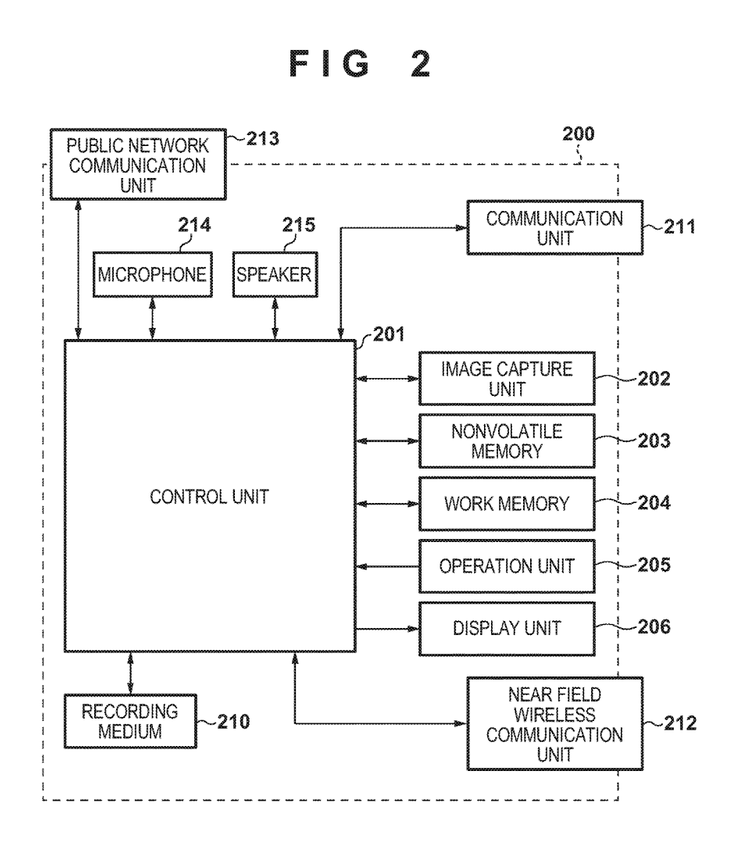
FIG. 2 is a diagram illustrating an exemplary configuration of an information processing apparatus 200 corresponding to the embodiment.

Next, an exemplary configuration of an information processing apparatus serving as an external apparatus that communicates with the digital camera 100 will be described. FIG. 2 is a block diagram illustrating an exemplary configuration of a mobile phone that is an exemplary information processing apparatus 200 of the present embodiment. In the following description of the embodiment, the information processing apparatus 200 will be described taking a mobile phone as an example, but the embodiment of the information processing apparatus 200 is not limited to a mobile phone. For example, the information processing apparatus 200 may be an arbitrary information processing apparatus or a remote control apparatus such as a digital camera, a smartphone, a PDA, a tablet device, a digital video camera, a mobile media player, or a remote controller. Hereinafter, the configuration of the mobile phone 200 will be specifically described with reference to FIG. 2.

A control unit 201 controls units of the mobile phone 200 according to an input signal and a later-described program. Note that, instead of the control unit 201 controlling the entire apparatus, a plurality of pieces of hardware may control the entire apparatus by sharing the processing. The image capture unit 202 converts light from the subject, an image being formed with the light by a lens included in the image capture unit 202, into an electrical signal, then performs noise reduction processing and the like, and outputs digital data as image data. The generated image data, after being stored in a buffer memory, is subjected to a predetermined operation by the control unit 201, and is recorded in a recording medium 210.

A nonvolatile memory 203 is an electrically erasable and recordable nonvolatile memory. An OS (operating system), which is basic software executed by the control unit 201, and an application that can realize an applicative function in cooperation with the OS are recorded in the nonvolatile memory 203. Also, in the present embodiment, an application for performing communication with the digital camera 100 is stored in the nonvolatile memory 203. A work memory 204 is used as an image display memory of a display unit 206, a work area of the control unit 201, and the like.

An operation unit 205 is used for accepting an instruction made by a user to the mobile phone 200. The operation unit 205 includes operation members such as a power button for the user to instruct power on/off of the mobile phone 200 and a touch panel formed in the display unit 206. The display unit 206 displays image data, displays text characters for an interactive operation, and the like. Note that the mobile phone 200 need not include the display unit 206. It is sufficient that the mobile phone 200 can connect to the display unit 206, and includes at least a display control function for controlling display of the display unit 206.

A recording medium 210 can record image data output from the image capture unit 202. The recording medium 210 may be configured to be detachable from the mobile phone 200, or may be incorporated in the mobile phone 200. That is, the mobile phone 200 need only have at least a unit for accessing the recording medium 210.

A communication unit 211 is an interface for connecting to an external apparatus. The mobile phone 200 of the present embodiment can exchange data with the digital camera 100 via the communication unit 211 and the communication unit 111 of the digital camera 100. In the present embodiment, the communication unit 211 is an antenna, and the control unit 101 can connect to the digital camera 100 via the antenna. Note that, the connection to the digital camera 100 may be a direct connection or a connection via an access point. A PTP/IP (Picture Transfer Protocol over Internet Protocol) through wireless LAN, for example, can be used as a protocol for communicating data. Note that the method of communication with the digital camera 100 is not limited thereto. The communication unit 211 may adopt an infrared communication module or a wireless communication module such as a Wireless USB, for example.

A near field wireless communication unit 212 realizes contactless near field communication with another apparatus such as the communication apparatus 100. The near field wireless communication unit 212 is constituted by an antenna for wireless communication, a modulation/demodulation circuit for processing a wireless signal, and a communication controller. The near field wireless communication unit 212 realizes near field wireless communication with the communication apparatus 100, which is an external apparatus, in conformity with the aforementioned BLE version 4.0 by outputting a modulated wireless signal from the antenna and demodulating a wireless signal received by the antenna. Also, the near field wireless communication unit 212 can realize contactless near field communication in conformity with the ISO/IEC 18092 standard (so-called NFC) as well. In this case, the near field wireless communication unit 212, upon receiving a data readout request from another device, outputs response data based on data stored in the nonvolatile memory 203. In the present embodiment, the mobile phone 200 works in a card reader mode, a card writer mode, and a P2P mode that are defined in the NFC standard through the near field wireless communication unit 212, and mainly acts as an initiator. On the other hand, the digital camera 100 mainly acts as a target via the near field wireless communication unit 112.

A public network communication unit 213 is an interface that is used when performing public wireless communication. The mobile phone 200 can perform a telephone call with another device via the public network communication unit 213. In this case, the control unit 201 realizes the telephone call by performing input/output of an audio signal via a microphone 214 and a speaker 215. In the present embodiment, the public network communication unit 213 is an antenna, and the control unit 101 can connect to a public network via the antenna. Note that one antenna can act as both the communication unit 211 and the public network communication unit 213. The above is a description of the mobile phone 200.

About Remote Control

Figure 3A:
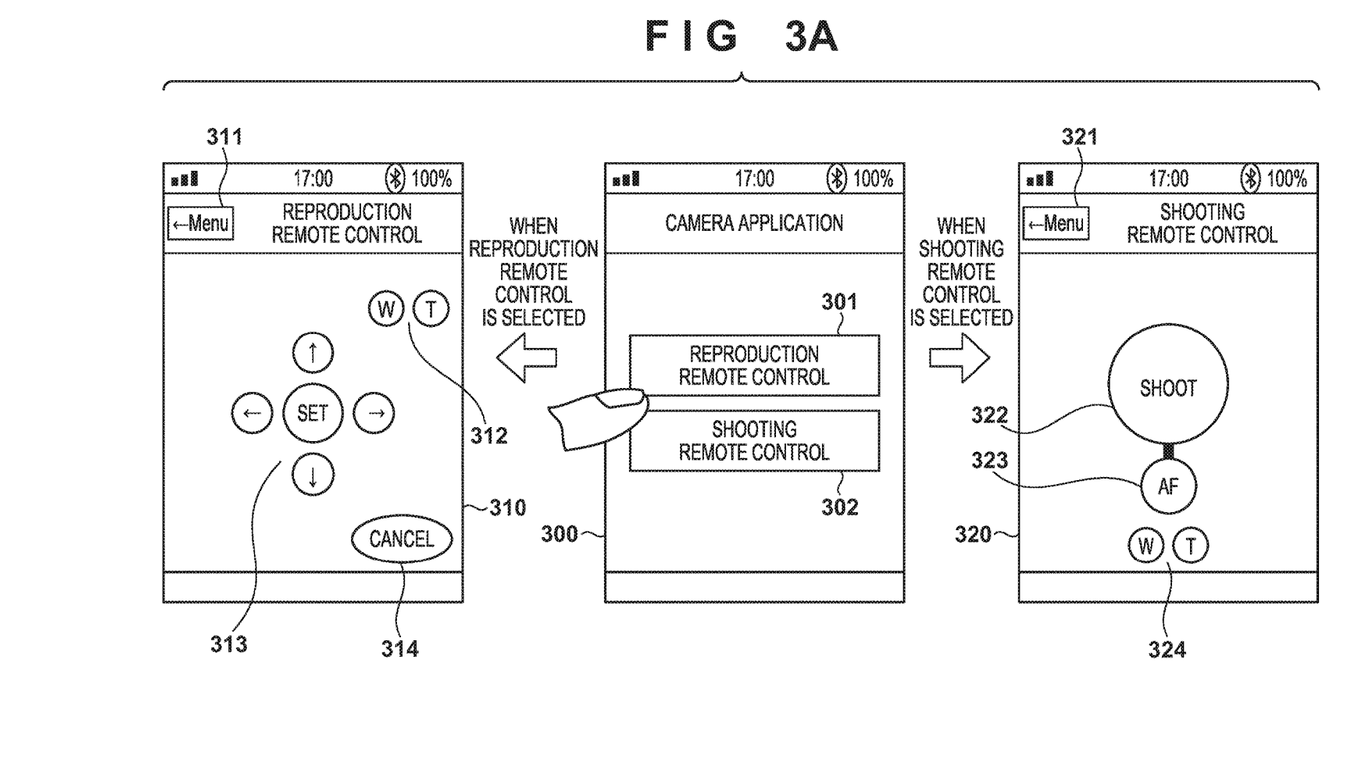
FIG. 3A is a diagram illustrating exemplary screens that are displayed in the information processing apparatus 200 corresponding to the embodiment.
Figure 3B:
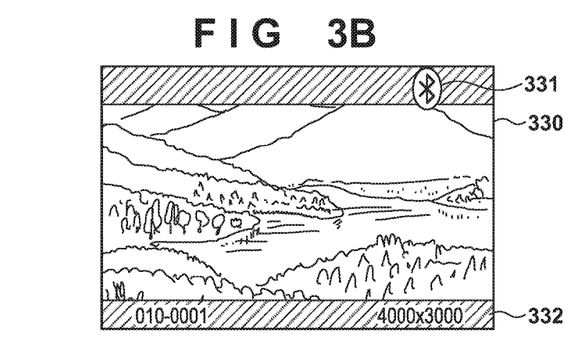
FIGS. 3B and 3C are diagrams illustrating exemplary screens that are displayed in the communication apparatus 100 corresponding to the embodiment.

In the present embodiment, remote control of the digital camera 100 is enabled by an application installed in the mobile phone 200. Hereinafter, exemplary screens that are to be displayed in the respective apparatuses will be described in the case where the digital camera 100 is remote-controlled by the mobile phone 200. FIGS. 3A and 3B illustrate exemplary GUI screens of the mobile phone 200 and the digital camera 100, respectively.

First, a screen 300 in FIG. 3A is an exemplary GUI screen of an application executed by the mobile phone 200 that is displayed in the display unit 206 when the digital camera 100 is remote-controlled by the mobile phone 200. The screen 300 includes a reproduction remote control button 301 and a shooting remote control button 302. A user of the mobile phone 200 can select one of the buttons (tap the touch panel surface at a position where the button is displayed) via the operation unit 205 (touch panel, for example). A screen 310 is an exemplary screen that is displayed in the display unit 206 of the mobile phone 200 when the reproduction remote control button 301 is selected on the screen 300. A plurality of operation buttons are displayed on the screen 310. The operation buttons include a menu button 311 for returning to the screen 300, an enlargement/reduction button 312 for performing enlargement/reduction of a reproduced image, an up/down/left/right determination button 313 for selecting an image to be reproduced, a cancel button 314 for cancelling an operation, and the like. These operation buttons correspond to operation functions provided by the operation unit 105 in a reproduction mode of the digital camera 100. Therefore, by operating these operation buttons, the user can perform the operations similar to those performed by directly operating the operation unit 105 of the digital camera 100.

A screen 320 is an exemplary screen that is displayed in the display unit 206 when the shooting remote control button 302 is selected on the screen 300. A plurality of operation buttons are displayed on the screen 320. The operation buttons include a menu button 321 for returning to the screen 300, a shooting button 322 corresponding to the SW2 of the release switch, an AF button 323 corresponding to the SW1, and a zoom button 324 for controlling zooming. These operation buttons correspond to operation functions provided by the operation unit 105 in a shooting mode of the digital camera 100. Therefore, by operating these operation buttons, the user can perform operations that are similar to those performed when directly operating the operation unit 105 of the digital camera 100.

The screens 300, 310, and 320 shown in FIG. 3A are exemplary screens displayed by the mobile phone 200, and the number and types of the operation buttons included in the respective screens are not limited to the mode shown here. Also, a button that does not exist in the digital camera 100 may be virtually displayed in the screens 310 and 320. For example, a slide show button for causing images to be displayed and to change at a predetermined timing is arranged in the reproduction remote control button 301. Furthermore, an oblique direction button may be arranged in addition to the up/down/left/right button.

Next, a screen 330 in FIG. 3B is an exemplary GUI screen that is displayed in the display unit 106 while the digital camera 100 is being remote-controlled to perform reproduction. The screen is displayed when the reproduction remote control button 301 is selected in the mobile phone 200 and the digital camera 100 works in a reproduction remote control mode. In the case where the near field wireless communication unit 112 of the digital camera 100 and the near field wireless communication unit 212 of the mobile phone 200 are Bluetooth-connected (BLE communication is performed), a mark 331 indicating that a Bluetooth-connected state is realized is displayed on the screen 330. Accordingly, the user can recognize that the digital camera 100 and the mobile phone 200 are Bluetooth-connected. Also, the screen 330 includes detailed image information 332, and accordingly, the user can recognize information associated with the image. Here, only an image number and resolution of the image are displayed, but the date, GPS information, a histogram, or the like may be displayed.

Figure 3C:
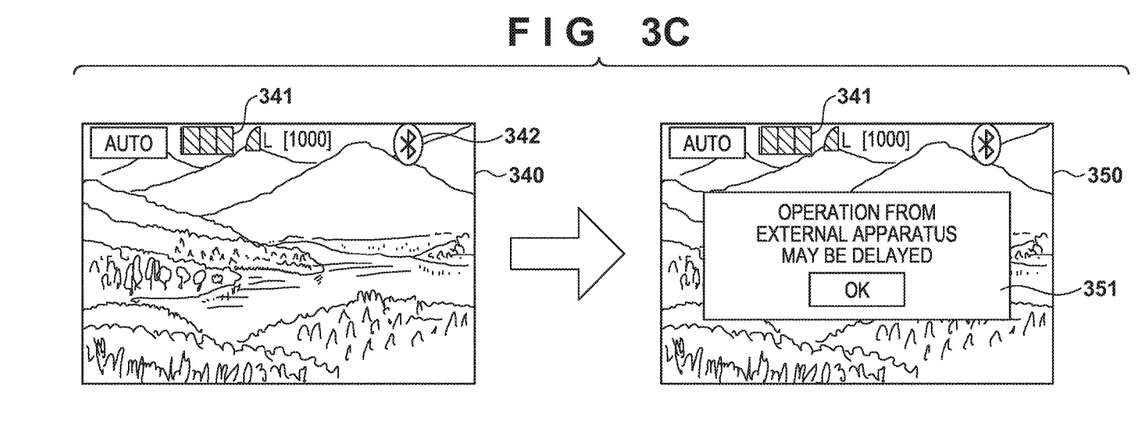

A screen 340 in FIG. 3C is an exemplary GUI screen that is displayed in the display unit 106 while the digital camera 100 is being remote-controlled to perform shooting. The screen is displayed when the shooting remote control button 302 is selected in the mobile phone 200 and the digital camera 100 works in a shooting remote control mode. The screen 340 includes shooting information 341 such as the shooting mode and the power supply state, and a mark 342 similarly to the screen 330. Also, a screen 350 is an exemplary GUI screen for displaying a warning at the time of later-described shooting remote control, and a pop-up 351 is displayed for warning the user.

Figure 4:
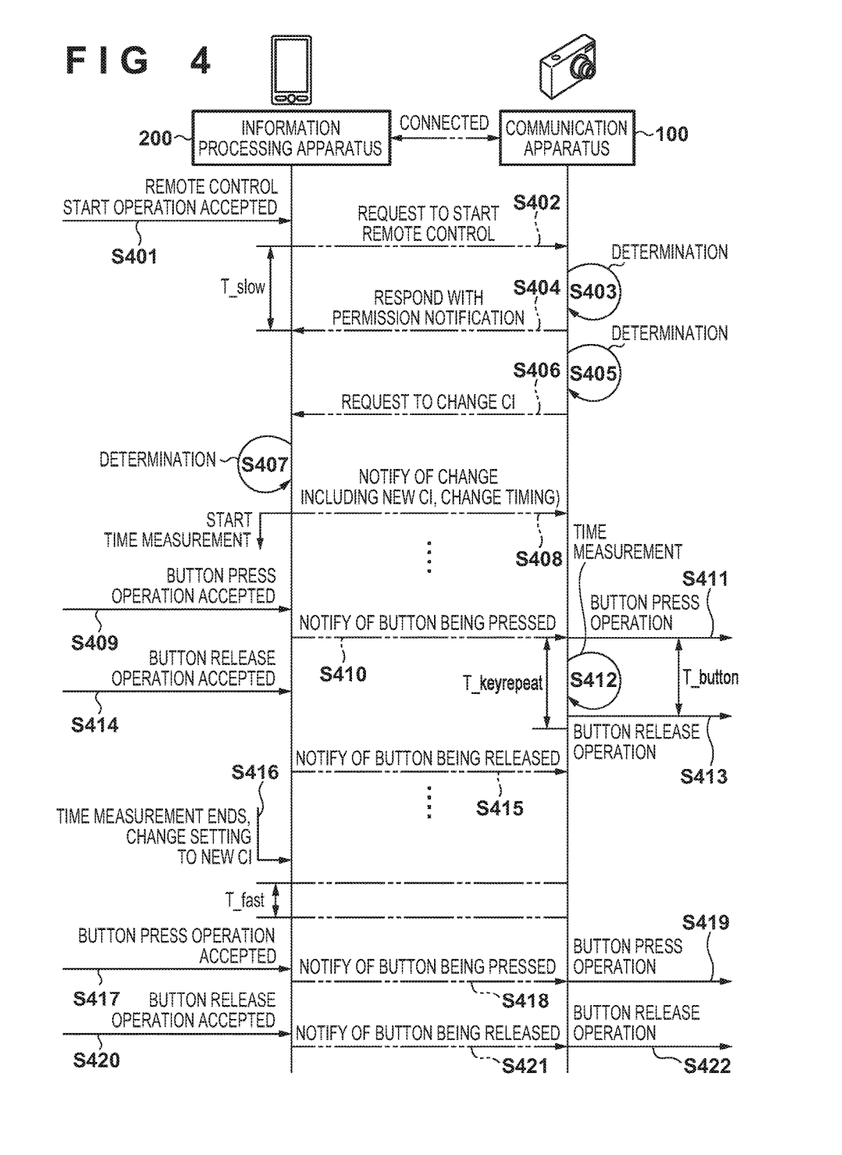
FIG. 4 is a diagram illustrating an exemplary sequence of tasks performed between apparatuses corresponding to the embodiment.

Next, a flow of the processing when the digital camera 100 according to the present embodiment is remote-controlled by the mobile phone 200 will be described. FIG. 4 is a schematic diagram illustrating a sequence of tasks when the digital camera 100 is remote controlled by the mobile phone 200 through Bluetooth (specifically, Bluetooth Low Energy: BLE). FIG. 4 shows a sequence of communication between the apparatuses, and exemplary tasks to be performed by the apparatuses to execute communication. The sequence of tasks is executed, in the digital camera 100, by processing blocks including the near field wireless communication unit 112 based on the control performed by the control unit 101. Also, the sequence of tasks is executed, in the mobile phone 200, by processing blocks including the near field wireless communication unit 212 based on the control performed by the control unit 201.

First, in step S401, in the mobile phone 200, the control unit 201 determines that a request to start remote control has been accepted based on the input from the user via the operation unit 205. In the following step S402, the control unit 201 transmits a remote control start request to the digital camera 100 by controlling the near field wireless communication unit 212 according to the request of starting remote control that was accepted in step S401. Upon the near field wireless communication unit 112 of the digital camera 100 receiving the request transmitted from the mobile phone 200, the control unit 101 determines, in step S403, whether or not the request can be accepted. In the case where the control unit 101 determines that the request can be accepted, the processing advances to step S404. In step S404, the control unit 101 controls the near field wireless communication unit 112 to transmit a permission notification response that is addressed to the mobile phone 200. The timing at which the permission notification response is transmitted is a timing at which a data transmission/reception interval (connection interval: CI, T_slow, here) in BLE has elapsed since the remote control start request was transmitted in step S402. The CI is set to the near field wireless communication unit 112 and the near field wireless communication unit 212. Accordingly, both the digital camera 100 and the mobile phone 200 transition to the remote control mode.

Upon transitioning to the remote control mode, the control unit 101 of the digital camera 100 determines, in step S405, whether or not the data transmission/reception interval (CI=T_slow) in the BLE is longer than a predetermined time in order to determine whether or not the CI needs to be changed. In the case where the control unit 101 determines that the CI needs to be changed, the processing advances to step S406. In step S406, the control unit 101 transmits a change request (CI change request) to change the length of CI that is addressed to the mobile phone 200 by controlling the near field wireless communication unit 112. The digital camera 100 can designate the value of a desired new CI in the CI change request. Here, the digital camera 100 specifies that the CI is to be shorter for the purpose of improving response for performing shooting. Note that, in the present embodiment, the digital camera 100 and the mobile phone 200 are assumed to be connected before entering the remote control mode. Also, the CI before transitioning to the remote control mode is assumed to have been set to be longer than the CI that is to be instructed after transitioning to the remote control mode for the purpose of suppressing power consumption.

The control unit 201 of the mobile phone 200, upon receiving the CI change request from the digital camera 100 via the near field wireless communication unit 212, determines whether the CI can be changed to the specified time in step S407. In the case where the control unit 201 determines that the time length change is possible, the processing advances to step S408. In step S408, the control unit 201 transmits a change notification that includes the length of the CI to which the CI will be changed (T_fast, here) and the timing (timing of step S416, here) to the digital camera 100 by controlling the near field wireless communication unit 212. Note that the reason as to why the timing of change is notified in this way is to follow the BLE standard. According to the BLE standard, the mobile phone 200 is prohibited from changing the CI immediately in response to the CI change request, and must wait for a period that corresponds to predetermined number of times (at least six times) of pre-change CI (old CI) to pass from when the change was notified to the digital camera 100. Therefore, the change notification in step S408 includes, in addition to the new CI value, the timing of step S416 that is the timing at which the CI is to be changed to the new CI and the long old pre-change CI will have been repeated six times. The control unit 201, in step S408, along with transmitting the change notification, starts to measure time in order to determine whether or not a period that corresponds to the old CI being repeated the predetermined number of times has elapsed.

In this way, even in a case where the mobile phone 200 determines to change the CI in response to the CI change request, the tasks continue with the old CI in the predetermined period. Therefore, there are cases where the digital camera 100 accepts a button operation request from the mobile phone 200 before the CI change has completed. Hereinafter, the tasks in such a case will be described. First, when the user of the mobile phone 200 performs a button press operation using the operation unit 205, the control unit 201 of the mobile phone 200 detects the button press operation by the user in step S409. Then, in the following step S410, the mobile phone 200 controls the near field wireless communication unit 212 to transmit a notification of accepting the button press operation (button press notification) to the digital camera 100 by. The button press notification includes information designating a control target button and information regarding the operation to be performed by the button (pressing down instruction, here), for example. Also, in the case where there are a plurality of operation target buttons, statuses of the respective buttons may be collectively included in the button press notification. For example, in an operation screen such as the screen 310 in FIG. 3A, information indicating statuses of on/off of the buttons displayed on the screen may be included in the button press notification.

The control unit 101 of the digital camera 100, upon receiving the button press notification from the mobile phone 200 via the near field wireless communication unit 112, internally issues an operation event of the button corresponding to the notification in step S411, and executes processing corresponding to the operation event. The control unit 101 executes the corresponding processing in parallel to the following steps. Accordingly, the pressed-down state of the button continues in the digital camera 100.

While the corresponding processing is executed (pressed-down state continues), the control unit 101 measures the elapsed time in step S412, and determines whether or not a predetermined time (T_button) has elapsed. In the case where the control unit 101 determines that the predetermined time has elapsed, the processing advances to step S413, and the control unit 101 issues an operation event that cancels the pressed-down state of the button that is the same as the button on which the pressing down operation is performed in step S411 and releases the button. The cancellation of the pressed-down state of the button is executed even if a button release notification from the mobile phone 200 has not been received.

Here, in the case where the pressed-down state of the button continues to exceed the predetermined time, the control unit 101 determines that a so-called long pressed state of the button is occurring according to the continuation period, and can issue the corresponding operation event again. Accordingly, the operation event is repeatedly issued. Repeating the same operation event such as this is referred to as "key repeat" in the present embodiment. In the case where the pressed-down state of a button is not cancelled, the pressed-down state continues, and the key repeat event occurs in this way, and there is a risk of a task that is different from the task intended by the user being executed in the digital camera 100.

For example, a case where the user of the mobile phone 200 performs a tap operation (after touching the screen with a finger, the finger is immediately removed from the screen) on the screen 310 is considered. In this case, the control unit 201 successively accepts a button press operation in step S409 shown in FIG. 4, and a button release operation in step S414 described later. In the case where the timing for notifying the digital camera 100 has not arrived at a point in time when the button release operation is accepted, only a button press notification that is based on the button press operation is transmitted at the notification timing arrived first. Then, the control unit 201 needs to wait for the arrival of the next notification timing, which will arrive after the CI has elapsed, in order to make a notification indicating the button release that is based on the button release operation that was accepted immediately after the button press operation. Here, the user is expecting that, since he/she has merely tapped the screen of the mobile phone 200, the digital camera 100 will execute the task corresponding to the button operation of releasing the button immediately after pressing down the button. However, in the case where the length of CI set at that time being longer than the predetermined time, the digital camera 100 cannot receive the button release notification after having received the button press notification even after the predetermined time has elapsed. In the present embodiment, a key repeat time (T_keyrepeat), which is a temporal reference for determining whether or not the key repeat task of a button operation is to be executed, is regarded as the predetermined time. In this case, the control unit 101 determines that the button is being continuously pressed, and executes the key repeat task. This is different from the task expected by the user.

Therefore, in the present embodiment, the control unit 101 automatically issues an operation event of the button release operation, in step S413, before the T_keyrepeat elapses after having received the button press notification, and as a result, the key repeat task is avoided, and the task expected by the user can be realized. Therefore, the T_button needs to be shorter than the time interval of the key repeat (T_keyrepeat) event, which is the reference for the control unit 101 to determine the button being operated is long-pressed or repeat, (T_keyrepeat>T_button).

Next, in step S414, upon the control unit 201 of the mobile phone 200 detecting a release operation of the button that has been in a pressed-down state based on the user operation on the operation unit 205, the processing advances to step S415. The control unit 201 controls the near field wireless communication unit 212 to transmit, in step S415, a notification for notifying that the button release operation has been accepted (button release notification) to the digital camera 100. The button release notification includes information for designating a control target button and information regarding the operation to be performed by the button (release instruction, here), for example. Also, in the case where there are a plurality of operation target buttons, similarly to the button press notification, statuses of the respective buttons may be collectively included in the button release notification. Although the control unit 101 of the digital camera 100 receives the button release notification from the mobile phone 200 via the near field wireless communication unit 112, the pressed-down state of the button has been already cancelled in the digital camera 100, and therefore, the control unit 101 does not specifically execute additional processing.

The control unit 201, in a period during which the above processing continues, monitors whether or not the period that corresponds to the predetermined number of times of the old CI has elapsed by performing the time measurement started in step S408. In the case where the control unit 201 determines that the period has elapsed in step S416, the control unit 201 changes the setting of the transmission/reception timing of the near field wireless communication unit 212 to the new CI. At this time, the control unit 101 of the digital camera 100 similarly changes the setting of the transmission/reception timing of the near field wireless communication unit 112 to the new CI. The CI set here is indicated by T_fast, and satisfies the relationship T_slow>T_keyrepeat>T_fast.

Thereafter, the communication between the digital camera 100 and the mobile phone 200 based on the BLE standard is performed at the time interval CI=T_fast. Therefore, in the case where the control unit 201 determines that, in step S417, a button press operation has been accepted from the user via the operation unit 205 of the mobile phone 200, the processing advances to step S418. The control unit 201 controls the near field wireless communication unit 212 according to the time interval of CI=T_fast notified in step S408, and transmits the button press notification to the digital camera 100. The control unit 101 of the digital camera 100, upon receiving the button press notification from the mobile phone 200 via the near field wireless communication unit 112, internally issues an operation event of the button corresponding to the notification in step S419, and executes the processing corresponding to the operation event. At this time, the setting of data transmission/reception interval CI of the communication between the digital camera 100 and the mobile phone 200 is changed to T_fast, which is shorter than T_keyrepeat. Therefore, measurement of the elapsed time in step S412, and issuance of the internal event of the button release operation in step S413 need not be performed.

Thereafter, in the case where the control unit 201 determines that, in step S420, a button release operation has been accepted from the user via the operation unit 205 of the mobile phone 200, the processing advances to step S421. In step S421, the control unit 201 controls the near field wireless communication unit 212 according to the time interval of CI=T_fast, and transmits the button release notification to the digital camera 100. The control unit 101 of the digital camera 100, upon receiving the button release notification from the mobile phone 200 via the near field wireless communication unit 112, internally issues an operation event of the button corresponding to the notification in step S422, and executes the processing corresponding to the operation event.

With the method described above, in the case where the digital camera 100 is remote-controlled by the mobile phone 200 through the BLE, a situation in which the digital camera 100 executes a task different from that expected by the user due to a long time length being set as the CI can be avoided.

Note that a case where a response to the notification is not required (write without response) is illustrated as the communication between the digital camera 100 and the mobile phone 200 in FIG. 4 for the purpose of illustration. In this case, it is sufficient that the following expressions are satisfied: T_slow>T_keyrepeat>T_button and T_keyrepeat>T_fast. In contrast, in the case where, when a notification is received, a response to the notification is required (write with response), a period of time corresponding to CI needs to be waited for in order to merely perform communication for response. In this case, the condition with respect to T_slow/T_fast is different, and is T_slow×2>T_keyrepeat>T_button and T_keyrepeat>T_fast×2.

Also, in FIG. 4, an embodiment is illustrated in which, even if button press operations were successively detected in the mobile phone 200, the mobile phone 200 transmits the button press notification only once at the timing at which the button pressing-down is first detected. As another embodiment other than the above, the control unit 201 may transmit the button press notifications to the digital camera 100 according to the time interval of CI by controlling the near field wireless communication unit 212 in a period during which the button press operations are successively detected, for example.

Also, in FIG. 4, a case in which the key repeat time (T_keyrepeat) is fixed is described, but the key repeat time may be individually set to each of the keys. Alternatively, the key repeat time may be different for each screen. In such a case, the new CI is set such that the time of the strictest condition (shortest key repeat time: T_keyrepeat_min) is the key repeat time.

Also, in FIG. 4, the processing to suppress the key repeat event is performed by issuing an event of the button release operation internally in the digital camera 100 in step S413, but a case is envisioned as well where the button release notification is not transmitted at the timing in step S415. In such a case, since the possibility of the user continuously pressing the button (state of touching the screen continues) is high, the control unit 101 issues an operation event for the button press operation again. With respect to the operation event issued again, the control unit 101 does not perform the time measurement in step S412 and the issuance of the operation event for the button release operation in step S413. Then, in the case of receiving the button release notification from the mobile phone 200, the control unit 101 issues an operation event for the button release operation. Accordingly, operations desired by the user can be more closely performed. Also, the timing at which the remote control operation is ended and the timing at which power is off are conceivable as a timing at which the CI is lengthened again in order to suppress power consumption after the new CI is set.

Figure 5:
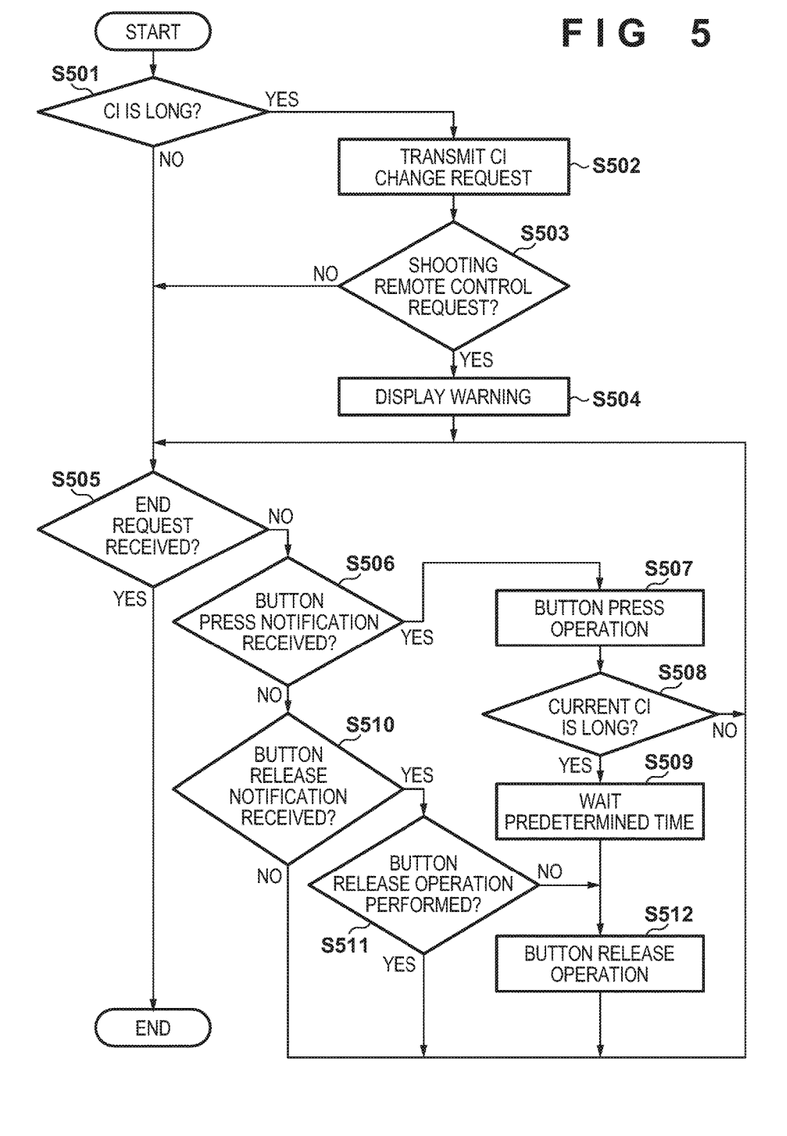
FIG. 5 is a flowchart illustrating exemplary tasks of the communication apparatus 100 corresponding to the embodiment.

Next, how the digital camera 100 serving as the communication apparatus works at the time of being remote-controlled corresponding to the task sequence in FIG. 4 will be described. FIG. 5 is a flowchart illustrating an example how the digital camera 100 works at the time of being remote-controlled. The processing shown in the flowchart is realized by the control unit 101 of the digital camera 100 controlling units of the digital camera 100 in accordance with the input signal and the program stored in the nonvolatile memory 103. Also, the processing in FIG. 5 is started in response to the digital camera 100 and the mobile phone 200 entering the remote control mode as a result of the digital camera 100 making the permission notification response (corresponding to step S404 in FIG. 4) to the instruction to start the remote control (corresponding to step S402 in FIG. 4) from the mobile phone 200 serving as the connection device.

In step S501, the control unit 101 determines whether or not the length of CI set at this point in time is as long as the communication interval of the near field wireless communication unit 112 with respect to the digital camera 100 being remote-controlled based on remote control from the mobile phone 200. The determination criteria with respect to the length of CI is dependent on the device, but is set such that the length of a period from when the button press notification is received until when the button release notification is received is shorter than the time length (key repeat time) according to which the key repeat of the pressed button is determined, as shown in FIG. 4. The key repeat time is a reference based on which, in the case where the same operation button is continuously operated, the operations performed on the button are determined to be successive inputs instead of a single input. Also, the key repeat time may have a different value for each of the operation buttons. Then, the control unit 101 compares the minimum value T_keyrepeat_min of the possible time lengths of T_keyrepeat with the length of CI (Tci) that is currently set. The control unit 101 can determine that the Tci is long in terms of remote control if $Tci \geq T\_keyrepeat\_min$. On the other hand, the control unit 101 determines that the Tci is not long in terms of remote control if $Tci < T\_keyrepeat\_min$.

If the control unit 101 determines that the Tci is long in terms remote control, the processing advances to step S502. On the other hand, if the control unit 101 determines that the Tci is not long, the processing advances to step S505. First, in step S502, the control unit 101 transmits a request to change the CI length (corresponding to the CI change request in step S406) to the mobile phone 200 via the near field wireless communication unit 112. In the subsequent step S503, the control unit 101 determines whether or not the remote control request is a shooting remote control. In the present embodiment, as described with reference to FIGS. 3A to 3C, the work modes of the digital camera 100 include the reproduction remote control mode and the shooting remote control mode. Therefore, the remote control start request transmitted from the mobile phone 200 includes information for designating the work mode. Therefore, if the control unit 101 determines that the remote control request is the shooting remote control request based on the work mode designated by the remote control start request, the processing advances to step S504. If the control unit 101 determines that the remote control request is the reproduction remote control request, the processing advances to step S505.

In step S504, the control unit 101 displays a warning (pop-up 351), in the display unit 106, such as that shown in the screen 350 in FIG. 3C, and notifies the user of the possibility of a delay in the timing of shooting. In the subsequent step S505, the control unit 101 determines whether or not the near field wireless communication unit 112 has received a request to end the remote control from the mobile phone 200. If the control unit 101 determines that the end request has been received, the control unit 101 ends the remote control. If the end request has not been received, the processing advances to step S506, and the control unit 101 determines whether or not the near field wireless communication unit 112 has received a button press notification. If the control unit 101 determines that the button press notification has been received, the processing advances to step S507, and if the control unit 101 determines that the button press notification has not been received, the processing advances to step S510. First, in step S507, the control unit 101 issues an operation event of the button designated in the button press notification in the apparatus, and executes the processing corresponding to the operation event. For example, in the case where the received button press notification is a pressed down notification of the SW1 based on the touch on the AF button 323 on the screen 320 shown in FIG. 3A, shooting preparation is performed by executing AF processing, AE processing, AWB processing, EF processing, and the like.

Next, in step S508, the control unit 101 determines whether or not the current CI is long by determining whether or not the expression $Tci \geq T\_keyrepeat\_min$ is satisfied by comparing the CI value Tci that is set at the time of determination in step S508 with the T_keyrepeat_min. In the case where $Tci \geq T\_keyrepeat\_min$ is satisfied and the control unit 101 determines that the current CI is long, the processing advances to step S509. In the case where $Tci < T\_keyrepeat\_min$ is satisfied, and the control unit 101 determines that the current CI is not long, the processing returns to step S505. In step S509, the control unit 101 measures the time elapsed from when the button press notification was received in step S506 (or when the button press operation is executed in step S507). If the control unit 101 determines that the predetermined time (corresponding to T_button in FIG. 4) has elapsed, the processing advances to step S512, the control unit 101 issues an operation event of cancelling the pressed-down state of the button that is the same as the button on which the pressing down operation was performed in step S507, and releasing the button, and the processing returns to step S505.

Also, in step S510, the control unit 101 determines whether or not the near field wireless communication unit 112 has received a button release notification. If the control unit 101 determines that the button release notification has been received, the processing advances to step S511, and if the control unit 101 determines that the button release notification has not been received, the processing returns to step S505. The control unit 101, in step S511, determines whether or not the operation event of cancelling the pressed-down state of the button that is the same as the button on which the pressing down operation is performed in step S507 and releasing the button has already been issued. If the control unit 101 determines that the button release operation event has already been issued, the processing returns to step S505. If the control unit 101 determines that the operation event has not been issued, the processing advances to step S512, and the control unit 101 executes the processing similar to that described above.

In the flowchart in FIG. 5, the control unit 101 executes the determination as to whether or not the current CI is long in step S508 with respect to any button for which the pressed down notification has been received. However, the embodiment is not limited thereto, and the control unit 101 may execute the determination only in cases where a pressed down notification for a specific button has been received. In such a case, after the processing in step S507 has been executed, the processing returns to step S505. The specific buttons include types of buttons for which "key repeat" has been determined if the pressing down operation thereon continues longer than the predetermined time.

For example, the zoom operation button in the shooting remote control is a button with respect to which the key repeat task is executed, because, when the button is continuously pressed down, enlargement and reduction are successively executed. On the other hand, there are cases where the user desires to perform fine adjustment of zooming, and in such a case, the user makes the operation period of the zooming operation button as short as possible in order to perform adjustment step by step. In such a case, if the key repeat task unintended by the user is executed due to the CI being long, operation feeling of the user is severely impaired. Therefore, the processing in step S508 may be executed regarding the button for zoom operation as the specific button. Also, at the time of reproduction remote control, the reproduced image displayed in the digital camera 100 can be switched by operating the up/down/left/right button. In the case where this up/down/left/right operation button is continuously pressed, the display image is successively changed, and therefore, this button is a button with respect to which the key repeat task is executed. On the other hand, there are cases where the user desires to change the reproduction image one by one, and in such a case the user makes the operation period of the operation button as short as possible such that the image is switched one by one. Therefore, the processing in step S508 may be executed regarding the up/down/left/right button at the time of reproduction remote control as the specific button. In this way, the processing in step S508 can be executed with respect to a predetermined operation in which executing a task corresponding to the pressing down operation as a single event and executing the task repeatedly is switched based on the continuity of the received pressing down operation.

Also, as for a button with respect to which the key repeat event is not determined even in a case where the button is continuously pressed down, the processing in step S508 can be omitted, because an adverse effect of the key repeat event is not incurred. For example, even if a SET button or cancel button is continuously pressed down, the function corresponding to the button is not successively executed.

Also, in step S504, a warning such as that shown in screen 350 is displayed at the time of shooting remote control, but the timing at which the warning is output may be changed according to the shooting mode and the shooting environment. As for the shooting mode, there are cases in which the AF mode is changed to continuous AF (focusing is successively performed during the operation on the SW1 continues), for example. Also, as for the shooting environment, there are cases where the movement of the subject is determined to be large based on the magnitude of the difference between frames, and the user is determined to be moving at a high speed. In these cases, if the digital camera 100 executes a task that is different from the task intended by the user, a photo opportunity will be missed, and therefore, it is envisioned that the shooting timing needs to be strictly controlled. Therefore, a warning may be output only in these cases. On the other hand, in the case of shooting a still life or the like in which the shooting timing need not be strictly controlled, the warning is not displayed to the user, and thus the user is not troubled by an unnecessary warning.

Also, in step S504, although a warning by text is displayed on the screen 350 when the shooting remote control is performed, a predetermined mark for warning may be displayed on the screen of the camera instead of the warning screen using text. In this case, the mark for warning continues to be displayed on the screen so as to be superimposed thereon for a period during which the expression $Tci \geq T\_keyrepeat\_min$ is satisfied. Then, when the length of CI has been changed, and it is determined in step S508 that the expression $Tci < T\_keyrepeat\_min$ is satisfied, this mark is cleared. Accordingly, the user is explicitly aware of the period during which the delay exists in the button operation. Also, it is conceivable that, when the remote control operation is performed, the user is often away from the camera. Therefore, a warning pop-up or a warning mark may be displayed on the screen of the mobile phone 200.

Also, in the above embodiment, a case was described where one of the shooting remote control or the reproduction remote control is selected on the mobile phone 200, and the digital camera 100 works according to the selection result. In contrast, the display screen on the mobile phone 200 side may be automatically changed according to the work mode of the digital camera 100. At this time, the user can shift the work mode from the shooting remote control to the reproduction remote control and from the reproduction remote control to the shooting remote control as well by operating the screen on the mobile phone 200 side. Therefore, the user need not select the work mode each time when performing the remote control start request.

Figure 6:
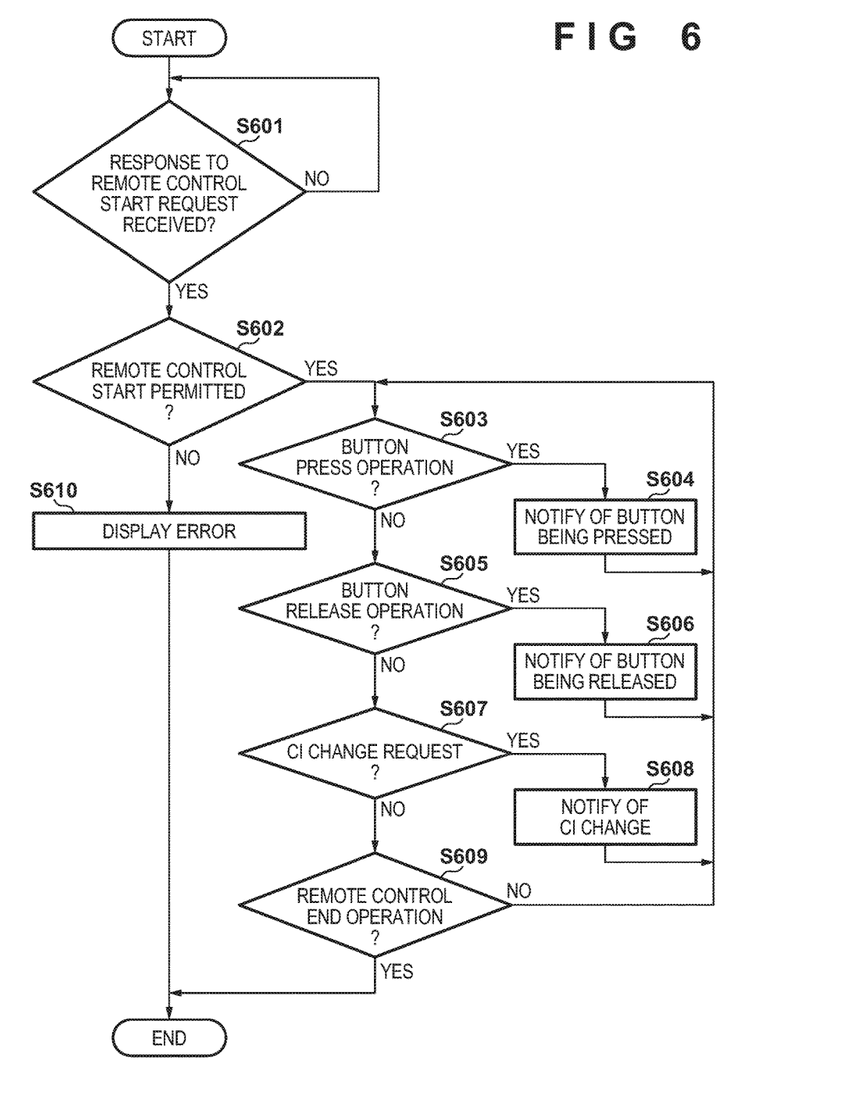
FIG. 6 is a flowchart illustrating exemplary tasks of the information processing apparatus 200 corresponding to the embodiment.

Next, how the mobile phone 200 serving as the information processing apparatus works at the time of being remote-controlled corresponding to the task sequence in FIG. 4 will be described. FIG. 6 is a flowchart illustrating an example of how the mobile phone 200 works while being remote-controlled. The processing shown in the flowchart is realized by the control unit 201 of the mobile phone 200 controlling units of the mobile phone 200 in accordance with the input signal and the program stored in the nonvolatile memory 203. Also, the processing in flowchart of FIG. 6 is started in response to the mobile phone 200 transmitting the remote control start request to the digital camera 100 serving as the connection device (corresponding to step S402 in FIG. 4) according to the instruction from the user to start the remote control.

First, in step S601, the control unit 201 determines whether or not the reply in response to the remote control start request has been received. If the control unit 201 determines that the near field wireless communication unit 212 has received a response from the digital camera 100, the processing advances to step S602. In step S602, the control unit 201 determines whether or not the remote control start has been permitted in the received response. If the control unit 201 determines that the remote control start has been permitted, the processing advances to step S603, and if it is determined as not being permitted, the processing advances to step S610. In step S610, the control unit 201 performs error display in the display unit 206, and then ends this processing.

Next, in step S603, the control unit 201 determines whether or not a button press operation has been performed in the operation unit 205, and if it is determined that the operation has been performed, the processing advances to step S604, and if it is determined that the operation has not been performed, the processing advances to step S605. In step S604, the control unit 201 transmits a button press notification for requesting the button press operation to the digital camera 100 via the near field wireless communication unit 212. Thereafter, the processing returns to step S603.

In step S605, the control unit 201 determines whether or not a button release operation has been performed in the operation unit 205, if it is determined that the operation has been performed, the processing advances to step S606, and if it is determined that the operation has not been performed, the processing advances to step S607. In step S606, the control unit 201 transmits a button release notification for requesting the button release operation to the digital camera 100 via the near field wireless communication unit 212. Thereafter, the processing returns to step S603.

In step S607, the control unit 201 determines whether or not the CI change request for changing the length of CI has been received from the digital camera 100 via the near field wireless communication unit 212. If the control unit 201 determines that the CI change request has been received, the processing advances to step S608, if the control unit 201 determines that the CI change request has not been received, the processing advances to step S609. In step S608, the control unit 201 transmits a CI change notification including information regarding the length of CI corresponding to the request and the timing at which the length of CI will be actually changed, the length of CI and the timing being determined considering the system restriction (such as time range) of the mobile phone 200, to the digital camera 100 via the near field wireless communication unit 212.

In step S609, the control unit 201 determines whether or not the operation to end the remote control operation has been performed in the operation unit 205, and if it is determined that the operation has not been performed, the processing returns to step S603. On the other hand, if it is determined that the end operation has been performed, this processing ends.

According to the present embodiment described above, the digital camera 100 independently executes the task to release the button with respect to which the digital camera 100 has received a pressing down operation in a period from when the digital camera 100 issued the CI change request until when the length of CI is actually changed. Accordingly, unnecessary key repeat events do not occur, and the occurrence of the key repeat task not anticipated by the user can be prevented. Also, according to the present embodiment, the possibility of the user failing to capture a desired shot can be reduced by issuing a warning at the time of the shooting remote control during which the shooting is influenced by the delay of the button operation due to the length of CI.

Although the present invention has been described in detail based on embodiments thereof, the present invention is not limited to these specific embodiments, and various configurations within a range that does not depart from the gist of this invention are also included in the present invention. Some of the embodiments mentioned above may also be combined as appropriate. The case where a software program that realizes the functions of the embodiment described above is supplied to a system or an apparatus having a computer capable of executing a program directly from a recording medium or using wired/wireless communication and this program is executed is also included in the present invention. Accordingly, the present invention is realized by the program code itself, which is supplied to the computer and installed thereon in order to realize the functional processing of the present invention with a computer. In other words, the computer program for realizing the functional processing of the present invention is itself included in the present invention. In this case, as long as the functions of a program are realized, any configuration of a program is possible, such as an object code, a program that is executed by an interpreter, or script data that is supplied to an OS. A recording medium for supplying the program may be, for example, a hard disk, a magnetic recording medium such as magnetic tape, an optical/magneto-optical storage medium, or a nonvolatile semiconductor memory.

Conceivable methods of supplying the program include a computer program for forming the present invention being stored in a server on a computer network, and a client computer connected to the computer network downloading and performing programming.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-076728, filed Apr. 6, 2016, which is hereby incorporated by reference herein in its entirety.

What is claimed is:

1. A communication apparatus that accepts remote control from an external apparatus via wireless communication, the communication apparatus comprising:
   a communication unit configured to communicate with the external apparatus; and
   a control unit configured to execute, in response to an operation request that the communication unit has received from the external apparatus, the request being performed through the remote control, a task corresponding to the operation,
   wherein the control unit
      sets a time period to at least one of a first time period which is longer than a predetermined time period, which is used for determining key repeat by the communication apparatus, and a second time period which is shorter than the predetermined time period, wherein the time period relates to a timing at which communication with the external apparatus is performed, controls the communication unit to perform communication with the external apparatus in compliance with the set time period,
in a case where the predetermined time period has elapsed, without accepting a request to cancel the operation from the external apparatus, after having accepted the operation request that the communication unit received from the external apparatus, the request being performed through the remote control, executes the task corresponding to the operation again,
in a case where the time period is set to the first time period which is longer than the predetermined time period, even if the predetermined time period has elapsed without receiving a request to cancel the operation transmitted from the external apparatus, performs control such that the task corresponding to the operation is not executed again,
in a case where the time period is set to the second time period which is shorter than the predetermined time period and the communication unit receives a request to cancel the operation before the predetermined time period has elapsed, the control unit cancels an operation state, and
in a case where the time period is set to the second time period which is shorter than the predetermined time period, when the predetermined time period has elapsed without accepting a request to cancel the operation from the external apparatus, the control unit executes a task corresponding to the operation again.

2. The communication apparatus according to claim 1, wherein the control unit, after having executed a task corresponding to the operation again, does not cancel an operated state until a request to cancel the operation from the external apparatus is accepted.

3. The communication apparatus according to claim 1, wherein a duration time is individually set to each of a plurality of operations with respect to which the communication apparatus can accept the remote control, a corresponding operation being repeatedly executed if the operation continues over the duration time, and
the predetermined time period is a time period corresponding to an operation whose duration time is the shortest among the plurality of operations.

4. The communication apparatus according to claim 1, wherein, in a case where an operation accepted from the external apparatus through the remote control is not a predetermined operation, the control unit performs control such that a task corresponding to the operation will not be executed again, regardless of the relationship between the set time period and the predetermined time period.

5. The communication apparatus according to claim 4, wherein the predetermined operation is an operation for switching executing a task corresponding to the operation as a single event and executing the task repeatedly based on the continuity of the operation that has been accepted.

6. The communication apparatus according to claim 1, further comprising a shooting unit configured to shoot a subject,
wherein the operation request is a request for shooting by the shooting unit.

7. The communication apparatus according to claim 1, further comprising a display unit configured to display an image,
wherein the operation request is a request for displaying an image by the display unit.

8. The communication apparatus according to claim 1, wherein the control unit determines whether or not the set time period is longer than the predetermined time period,
in a case where the control unit determines that the set time period is longer, the communication unit transmits a request to change a time period to the external apparatus, and receives a response from the external apparatus in response to the request, and
the control unit changes a setting to the second time period that is shorter than the predetermined time period according to the response from the external apparatus.

9. The communication apparatus according to claim 8, wherein, in a case where the communication unit transmits a request to change the time period, the control unit causes a display unit to perform display for notifying a user of the communication apparatus of a delay in a response with respect to the remote control.

10. A control method of a communication apparatus that accepts remote control from an external apparatus via wireless communication, the control method comprising:
setting a time period to at least one of a first time period which is longer than a predetermined time period, which is used for determining key repeat by the communication apparatus, and a second time period which is shorter than the predetermined time period, wherein the time period relates to a timing at which communication with the external apparatus is performed;
performing communication with the external apparatus within the set time period;
executing, in response to an operation request received from the external apparatus in the communication, the request being made through the remote control, a task corresponding to the operation;
in a case where the predetermined time period has elapsed, without accepting a request to cancel the operation from the external apparatus, after having accepted the operation request received from the external apparatus, the request being made through the remote control, executing a task corresponding to the operation again;
in a case where the time period is set to the first time period which is longer than the predetermined time period, even if the predetermined time period has elapsed without receiving a request to cancel the operation transmitted from the external apparatus, performing control such that a task corresponding to the operation is not executed again,
in a case where the time period is set to the second time period which is shorter than the predetermined time period and the communication unit receives a request to cancel the operation before the predetermined time period has elapsed, the control unit cancels an operation state, and
in a case where the time period is set to the second time period which is shorter than the predetermined time period, when the predetermined time period has elapsed without accepting a request to cancel the operation from the external apparatus, the control unit executes a task corresponding to the operation again.

11. A non-transitory computer-readable storage medium storing a program that, when executed by a processor of a communication apparatus that accepts remote control from an external apparatus via wireless communication, causes the processor to perform operations comprising:

setting a time period to at least one of a first time period which is longer than a predetermined time period, which is used for determining key repeat by the communication apparatus, and a second time period which is shorter than the predetermined time period, wherein the time period relating to a timing at which communication with the external apparatus is performed;

performing communication with the external apparatus within the set time period;

executing, in response to an operation request received from the external apparatus in the communication, the request being made through the remote control, a task corresponding to the operation;

in a case where predetermined time period has elapsed, without accepting a request to cancel the operation from the external apparatus, after having accepted the operation request received from the external apparatus, the request being made through the remote control, executing a task corresponding to the operation again;

in a case where the time period is set to the first time period which is longer than the predetermined time period, even if the predetermined time period has elapsed without receiving a request to cancel the operation transmitted from the external apparatus, performing control such that a task corresponding to the operation is not executed again, in a case where the time period is set to the second time period which is shorter than the predetermined time period and the communication unit receives a request to cancel the operation before the predetermined time period has elapsed, the control unit cancels an operation state, and in a case where the time period is set to the second time period which is shorter than the predetermined time period, when the predetermined time period has elapsed without accepting a request to cancel the operation from the external apparatus, the control unit executes a task corresponding to the operation again.

\* \* \* \* \*